United States Patent
Sobolevskiy et al.

(10) Patent No.: US 7,718,153 B2
(45) Date of Patent: May 18, 2010

(54) CATALYTIC PROCESS FOR CONTROL OF $NO_x$ EMISSIONS USING HYDROGEN

(75) Inventors: Anatoly Sobolevskiy, Orlando, FL (US); Joseph A. Rossin, Columbus, OH (US); Michael J. Knapke, Hilliard, OH (US)

(73) Assignee: Siemens Energy, Inc., Orlando, FL (US)

( * ) Notice: Subject to any disclaimer, the term of this patent is extended or adjusted under 35 U.S.C. 154(b) by 68 days.

(21) Appl. No.: 12/122,116

(22) Filed: May 16, 2008

(65) Prior Publication Data

US 2009/0285740 A1 Nov. 19, 2009

(51) Int. Cl.
*B01D 53/56* (2006.01)
*B01D 53/74* (2006.01)
*G05D 21/00* (2006.01)

(52) U.S. Cl. .................. 423/239.1; 422/105; 422/129; 422/168; 422/177; 422/187

(58) Field of Classification Search ............... 423/239.1; 422/105, 129, 168, 177, 187
See application file for complete search history.

(56) References Cited

U.S. PATENT DOCUMENTS

| | | | |
|---|---|---|---|
| 4,312,638 A | 1/1982 | Koump | |
| 5,543,124 A | 8/1996 | Yokota et al. | |
| 5,589,142 A | 12/1996 | Gribbon | |
| 5,710,085 A | 1/1998 | Absil et al. | |
| 5,753,192 A * | 5/1998 | Dobson et al. | 422/177 |
| 5,891,409 A | 4/1999 | Hsiao et al. | |
| 5,955,039 A | 9/1999 | Dowdy | |
| 6,689,709 B1 | 2/2004 | Tran et al. | |
| 7,049,261 B2 | 5/2006 | Nam et al. | |
| 7,105,137 B2 | 9/2006 | Efstathiou et al. | |
| 2003/0104932 A1* | 6/2003 | Kim | 502/216 |

(Continued)

FOREIGN PATENT DOCUMENTS

JP 04341325 A 11/1992

(Continued)

OTHER PUBLICATIONS

Ola Maurstad; "An Overview of Coal Based Integrated Gasification Combined Cycle (IGCC) Technology", MIT Laboratory for Energy and the Environment, publication No. LFEE 2005-002 WP; (http://free.mit.edu/publications); 2005; pp. i-iii and 1-41.

(Continued)

*Primary Examiner*—Timothy C Vanoy (57) ABSTRACT

A selective catalytic reduction process with a palladium catalyst for reducing NOx in a gas, using hydrogen as a reducing agent. A zirconium sulfate $(ZrO_2)SO_4$ catalyst support material with about 0.01-2.0 wt. % Pd is applied to a catalytic bed positioned in a flow of exhaust gas at about 70-200° C. The support material may be $(ZrO_2—SiO_2)SO_4$. $H_2O$ and hydrogen may be injected into the exhaust gas upstream of the catalyst to a concentration of about 15-23 vol. % $H_2O$ and a molar ratio for $H_2/NO_x$ in the range of 10-100. A hydrogen-containing fuel may be synthesized in an Integrated Gasification Combined Cycle power plant for combustion in a gas turbine to produce the exhaust gas flow. A portion of the fuel may be diverted for the hydrogen injection.

19 Claims, 5 Drawing Sheets

| Concentration in exhaust gas | | H2- SCR NOx Removal Efficiency | | |
|---|---|---|---|---|
| SO2 ppm | H2O % | Pd 0.75% | Pd 0.75% W 1.0% | Pd 0.75% W 5.0% |
| 0 | 5 | 75 | 89 | 86 |
| 5 | 10 | 79 | 88 | 83 |
| 5 | 20 | 94 | 91 | 93 |
| 10 | 5 | 82 | 92 | 91 |
| 10 | 20 | 86 | 90 | 91 |
| NOx reduction % within a range of 120 - 140°C | | | | |

U.S. PATENT DOCUMENTS

| | | |
|---|---|---|
| 2005/0032637 A1* | 2/2005 | Kim .................... 502/216 |
| 2005/0090393 A1 | 4/2005 | Efstathiou et al. |
| 2007/0110643 A1 | 5/2007 | Sobolevskiy et al. |
| 2007/0181854 A1 | 8/2007 | Briesch et al. |
| 2007/0289214 A1 | 12/2007 | Briesch et al. |

FOREIGN PATENT DOCUMENTS

| | | | |
|---|---|---|---|
| JP | 2000-342972 A | * | 12/2000 |
| JP | 2001-162171 A | * | 6/2001 |
| JP | 2006-289175 A | * | 10/2006 |
| WO | 2007020035 A1 | | 2/2007 |

OTHER PUBLICATIONS

A. Fritz and V. Pitchon; "The Current State of Research on Automotive Lean NO$x$ Catalysis"; Applied Catalysis B, Environmental 13; 1997, pp. 1-25.

R. Burch, M.D.Coleman; An Investigation of the NO/H$_2$/O$_2$ Reaction on Noble-Metal Catalyts at Low Temperatures under Lean-Burn Conditions; Applied Catalysis B: Environmental 23 ; 1999, pp. 115-121.

C. Costa et al, "Low-Temperature H$_2$-SCR of NO on a Novel Pt/BgO-CeO$_2$ Catalyst"; Applied Catalysis B: Environmental, 72; 2007, pp. 240-252.

C. Costa et al.; "An Investigation of the NO/H$_2$/O$_2$ (Lean De-NO$_x$) Reaction on a Highly Active and Selective Pt/La$_{0.7}$Sr$_{0.2}$De$_{0.1}$Fe$_3$ Catalyst at Low Temperatures"; Journal of Catalysis, 209 ; 2002, pp. 456-471.

M. Machida et al.; "Low Temperature Catalytic NO$_x$-H$_2$ Reactions over Pt/TiO$_2$-ZrO$_2$ in an Excess Oxygen"; Applied Catalysis B: Environmental 35; 2001, pp. 107-116.

* cited by examiner

| Concentration in exhaust gas | | H2- SCR NOx Removal Efficiency | | |
|---|---|---|---|---|
| $SO_2$ ppm | $H_2O$ % | Pd 0.75% | Pd 0.75% W 1.0% | Pd 0.75% W 5.0% |
| 0 | 5 | 75 | 89 | 86 |
| 5 | 10 | 79 | 88 | 83 |
| 5 | 20 | 94 | 91 | 93 |
| 10 | 5 | 82 | 92 | 91 |
| 10 | 20 | 86 | 90 | 91 |
| | | NOx reduction % within a range of 120 - 140°C | | |

CATALYTIC PROCESS FOR CONTROL OF NO$_x$ EMISSIONS USING HYDROGEN

STATEMENT REGARDING FEDERALLY SPONSORED DEVELOPMENT

Development for this invention was supported in part by Contract No. DE-FC26-05NT42644, awarded by the United States Department of Energy, Accordingly, the United States Government may have certain rights in this invention.

FIELD OF THE INVENTION

This invention relates to a catalytic process for reduction of nitrogen oxides (NO$_x$) in combustion exhaust by selective catalytic reduction (SCR) using hydrogen as a reducing agent. The invention also relates to the field of power generation, and more particularly to the control of NO$_x$ emissions produced during combustion of a fuel containing hydrogen to produce power, and specifically to the catalytic treatment of exhaust gases from a gas turbine power generating station at a coal gasification plant. However, the invention may also be employed in NO$_x$ abatement from other sources, such as emissions generated during manufacture of nitric acid, in internal combustion engines, etc.

BACKGROUND OF THE INVENTION

The reduction of CO$_2$ emissions from fossil fuel power plants is an important effort for protection of the environment on the global scale. Coal based integrated gasification combined cycle plant (IGCC) technology enables production of electricity with a gas turbine utilizing a fuel that is rich in hydrogen and has a very limited amount of CO$_2$. Combustion of a hydrogen-containing fuel requires dilution with a gas that in most cases contains nitrogen. As a result, a byproduct of the hydrogen-containing fuel combustion is a significant amount of NO$_x$ that can be reduced by using selective catalytic reduction systems in addition to low NO$_x$ combustors in the gas turbine.

Since fuel produced and used at an IGCC plant contains hydrogen (H$_2$), it can also provide hydrogen for a reducing agent in the SCR process by introducing a small amount of H$_2$ from the fuel supply into the SCR. The use of hydrogen as a NO$_x$ reducing agent allows elimination of ammonia as a reducing agent in the SCR system, and thus prevents discharge of ammonia slip into the ambient air, which is an inherent problem with current ammonia SCR technology.

It is known by those skilled in the art that H$_2$-SCR is an efficient technology in O$_2$-lean conditions, especially when amounts of water and sulfur compounds are limited to less than 5 vol. % and to less than 5 ppm; respectively. Reduction of NO$_x$ using H$_2$ has the potential to generate reaction products that include both N$_2$ and N$_2$O. Obviously, catalysts with high selectivities towards the formation of N$_2$ are preferred. It is known to those skilled in the art that the selectivity of Pt-based H$_2$-SCR catalysts toward N$_2$ formation is relatively low, and undesirable byproducts such as N$_2$O and NH$_3$ are produced.

Recently, a strong attempt to improve H$_2$-SCR efficiency with respect to NO$_x$ removal and N$_2$ selectivity under oxidizing conditions was made (U.S. Pat. No. 7,105,137). A developed Pt-based catalyst was durable for 24 hours when operating in a reaction mixture that contained 5 vol. % O$_2$, 5 vol. % H$_2$O, and up to 25 ppm of SO$_2$. M. Machida et al., Applied Catalysis B. Environmental 35 (2001) 107, demonstrated that a Pt-based H$_2$-SCR can have high selectivity to N$_2$ under oxidizing conditions (10 vol. % O$_2$) without H$_2$O and SO$_2$ present in the process stream. However demonstrations of the H$_2$-SCR that ability to efficiently reduce NO$_x$ emissions were done for mixtures of gases have relatively low concentrations of O$_2$, H$_2$O, and SO$_2$ or high concentrations of only one of O$_2$, H$_2$O, or SO$_2$ which is contrasted to a gas turbine exhaust mixture from combustion of H$_2$-containing fuels at IGCC plants.

Commercial processes such as Selexol™ can remove more than 97% of the sulfur from syngas. Still, the concentration of sulfur compounds in syngas can be up to 20 ppm. Taking into consideration dilution of syngas with nitrogen, the concentration of SO$_2$ in IGCC gas turbine exhaust can be at the level of 5 to 10 ppm. After CO$_2$ sequestration and burning of H$_2$-fuel, concentrations of H$_2$O in the exhaust can be as high as 20% by volume, and oxygen content can reach 6-10 vol. %. Under these conditions, developing a process to reduce NO$_x$ emissions in the exhaust of IGCC gas turbines by using H$_2$-SCR is challenging. Thus, despite the above-described enhancements, there is a need to develop a process to reduce NO$_x$ emissions in gas turbine exhaust utilizing an H$_2$-SCR that provides high NO$_x$ reduction efficiency at the level of 90+% with high (greater than 90%) selectivity to N$_2$. Additional process requirements include extended durability and stability in presence of 10-25 vol. % of water, 5-10 vol. % of O$_2$, and 5-10 ppm of SO$_2$.

BRIEF DESCRIPTION OF THE DRAWINGS

The invention is explained in the following description in view of the drawings that show.

DETAILED DESCRIPTION OF THE INVENTION

Figure 1:
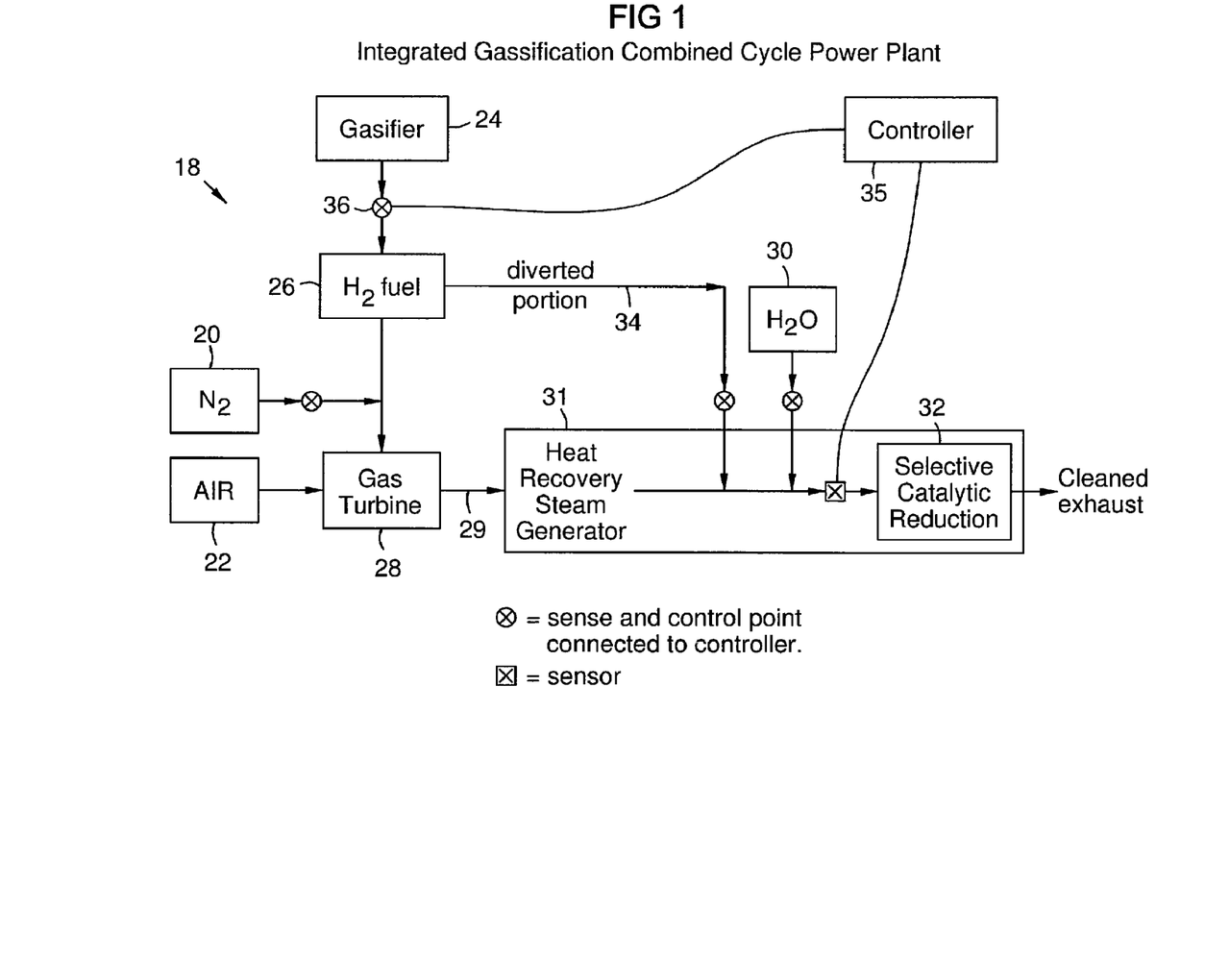
FIG. 1 is a schematic view of an integrated gasification combined cycle power plant according to an embodiment of the invention.

FIG. 1 illustrates an integrated gasification combined cycle power plant system 18 that produces an H$_2$-containing fuel 26 (syngas, or H$_2$-rich fuel after CO$_2$ capture) using a gasification process 24. The fuel is diluted with nitrogen 20, and combined with air 22 for combustion in a gas turbine 28. Turbine exhaust gas 29 is directed to a heat recovery steam generator (HRSG) 31, which includes or is otherwise located upstream of a selective catalytic bed 32 that is positioned at a location suitable for a desired SCR temperature operating range. The exhaust passes to a selective catalytic reduction bed 32 where one or more NO$_x$ reduction catalyst layers promote the destruction of NO$_x$ by a reducing agent, such as for example H$_2$, producing primarily N$_2$ and H$_2$O. A diverted portion 34 of the $H_2$-containing fuel 26 may be used as a reducing agent for $NO_x$ reduction reaction in the $H_2$-SCR bed 32. A water injection system 30 may be used to improve $NO_x$ reduction reactions within the $H_2$-SCR bed 32. A controller 35 is connected to sensors and valves 36 to sense and control the process. A catalyst is disclosed herein with improved stability in exhaust gas 29 with high contents of oxygen, water, and sulfur. The catalyst in one embodiment comprises Pd supported on sulfated $ZrO_2$—$SiO_2$ oxides, and may include a promoter such as tungsten (W).

Figure 2:
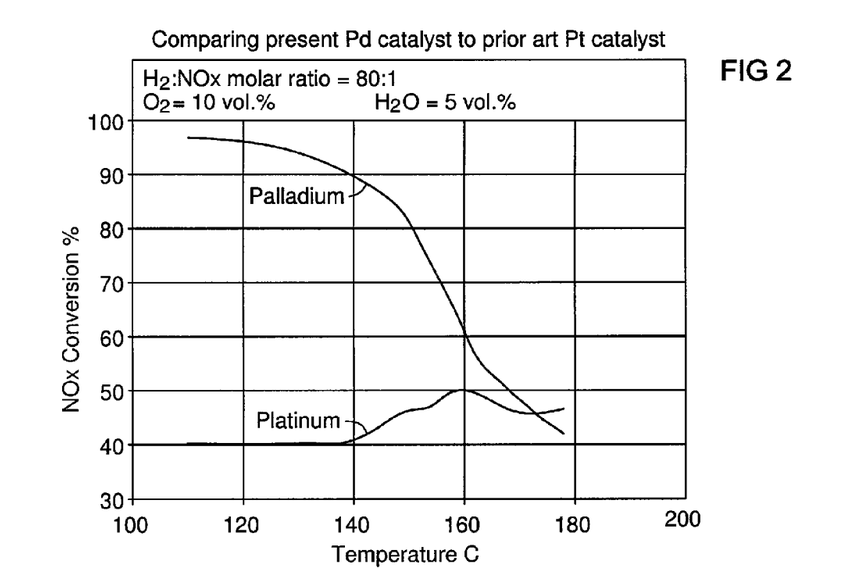
FIG. 2 shows NO$_x$ reduction efficiency using a platinum-based prior art catalyst compared with the present palladium-based catalyst over a temperature range.
Figure 3:
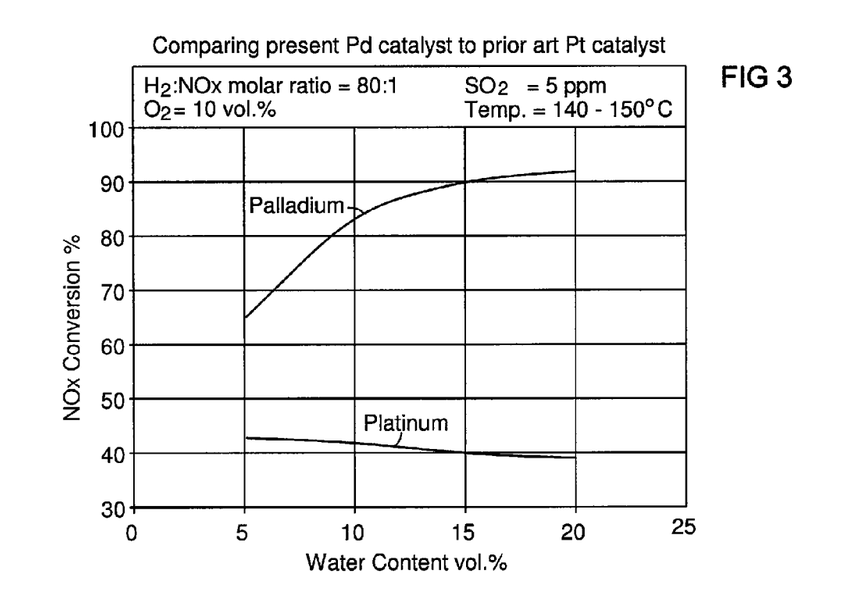
FIG. 3 shows NO$_x$ reduction efficiency using a platinum-based prior art catalyst compared with the present palladium-based catalyst versus water content.

A baseline comparative catalyst was produced using known methods as described in reference U.S. Pat. No. 7,105,137 (Efstathious et al.), with platinum as an active metal. A catalyst prepared as described in U.S. Pat. No. 7,105,137 is not suitable for use in heat recovery steam generators at power plants, because it is in the geometric form of a powder, which would result in a considerably high pressure drop across the catalyst bed which causes dramatic decrease in IGCC plant power output. A catalyst needs to be in a geometric form which allows for achieving a high $NO_x$ reduction efficiency along with minimal pressure drop. Although beads, extrudates, etc. are suitable geometric forms for commercial applications, the monolith is the preferred form. The monolithic form and the use of a monolith as a catalyst carrier are well known to one skilled in the art. A monolith consists of a series of straight, non-interconnecting channels. Onto the walls of the channels is impregnated a thin layer of catalyst support material, termed "washcoat" by the trade. It is within the pores of the washcoat that the catalytically active metals are impregnated. Thus, a honeycomb monolith was washcoated with the catalyst prepared as described in U.S. Pat. No. 7,105,137 to compare it with the catalyst described in this invention, which is suitable for industrial applications in power plants using the same substrate. FIGS. 2 and 3 show a dramatic improvement achieved, by utilizing the present catalyst prepared according to the procedure described under Example 1 below.

As shown in FIGS. 2 and 3, the catalyst of the present invention displays a substantial increase in $NO_x$ reduction efficiency over the baseline catalyst (U.S. Pat. No. 7,105,137) under gas turbine exhaust conditions. It was found also that the baseline catalyst, as with other catalysts based on platinum with different supports ($Al_2O_3$, MgO, $TiO_2$, $CeO_2$, $Y_2O_3$, etc.), has a high selectivity to $N_2O$ which is an undesirable pollutant. The selectivity to $N_2O$ for the baseline catalyst was 15.4% while measurements of the same parameter for the catalyst described in this invention showed only traces of $N_2O$ in the effluent of the catalytic bed.

In one embodiment, a catalyst comprising zirconia, sulfur, palladium, and preferably also comprising silica and tungsten, is prepared according to the following steps in combination and displayed superior performance:
1. Zirconia-silica sulfate (($ZrO_2$—$SiO_2$)$SO_4$) was prepared, then calcined at 450° C. to 850° C. for between 15 minutes and 48 hours, with a preferred calcination time of 2 hours.
2. A substrate was washcoated with the prepared ($ZrO_2$—$SiO_2$)$SO_4$ and with promoters such as tungsten or other transition metals, then calcined at a temperature and duration effective to decompose the metal salts, such as for example 350° C. to 650° C. for about 1 hour.
3. The coating was then impregnated with a Pd metal precursor.
4. The coating was then heat-treated in a flue gas at a temperature sufficient to decompose the palladium metal complex, such as for example at least 200° C. to 550° C., or higher, such as for example a duration sufficient to decompose the metal complex.

In preparation of the catalyst, a binder may be needed in order to adhere the ($ZrO_2$—$SiO_2$)$SO_4$ to the monolithic substrate. Use of binders is well known to one skilled in the art. Binders such as clays, aluminas, silicas, zirconias, etc. may be employed. It should be noted that there are numerous methods for the preparation of sulfated zirconia and sulfated zirconia silica known to one skilled in the art. These techniques involve the preparation of $ZrO_2$ or $ZrO_2$—$SiO_2$, following by treatment with sulfuric acid, then calcination at an elevated temperature. Alternatively, and more preferably, the sulfated $ZrO_2$ or $ZrO_2$—$SiO_2$ may be prepared by blending zirconium hydroxide or, in the case of $ZrO_2$—$SiO_2$, zirconium hydroxide and a silica source, such as for example colloidal silica, fumed silica or finely crushed silica particles.

When it is desired to operate the catalyst of the present invention at low temperatures, for example at temperatures less than about 200° C., it is desired that the catalyst be activated in flowing gas mixtures containing oxygen prior to operation at a temperature sufficient to oxidize any residue associated with the palladium metal precursor. This is because while calcining the catalyst in the monolithic form, there is no flow through the channels of the monolith. As a result, the palladium metal precursors are decomposed, but the decomposition residue still remains on the surface of the catalyst, potentially inhibiting the activity of the resulting catalyst. As a result, the catalyst must be "activated" prior to use by heating to a temperature sufficient to oxidize the residue, thereby removing said residue from the surface of the catalyst. This temperature is greater than about 200° C.

The resulting developed catalyst is very stable without deactivation over extended periods of time, and demonstrates a high $NO_x$ reduction efficiency even in the presence of 5-10 ppm of $SO_2$, an $O_2$ content 5-10 vol. %, and water up to 25 vol. %. Moreover, increasing water content dramatically improves the catalyst performance, which presents an opportunity to achieve high $NO_x$ removal efficiency in gas turbine exhaust by simply injecting additional water (e.g. steam) upstream of the SCR bed, should insufficient water be present in the process stream.

Figure 4:
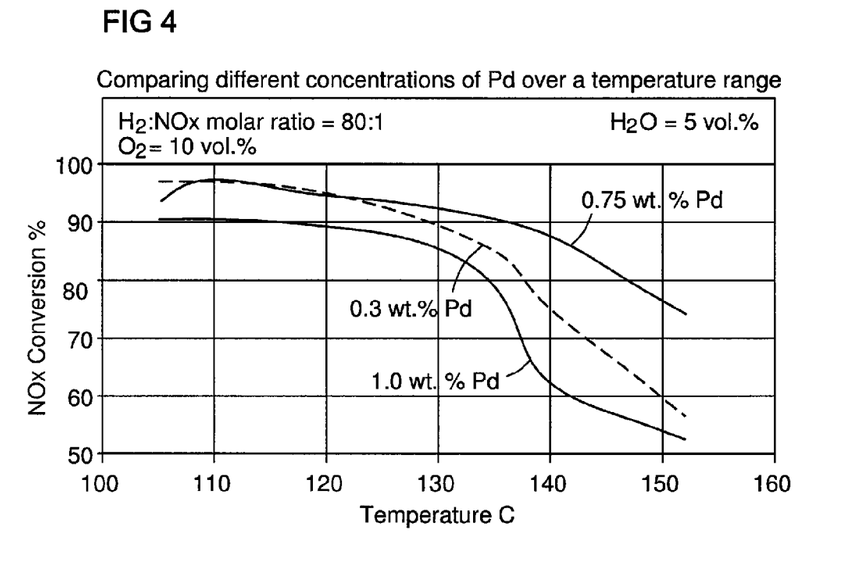
FIG. 4 shows NO$_x$ reduction efficiency of three different concentrations of Pd over a temperature range.
Figure 5:
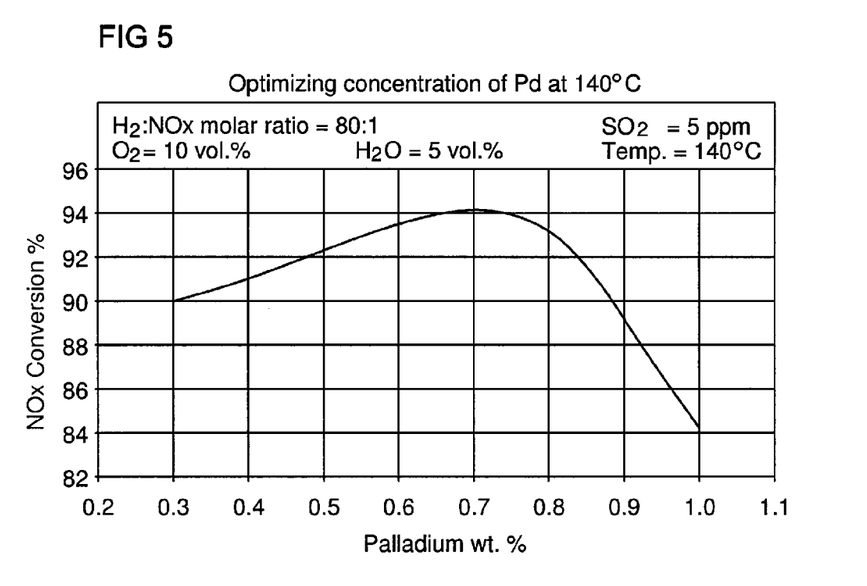
FIG. 5 shows NO$_x$ reduction efficiency with varying concentration of Pd at 140° C.

The catalytic process described in this invention enables 90% to greater than 97% $NO_x$ reduction efficiency to $N_2$ in a simulated gas turbine exhaust in some applications by using hydrogen as a reducing agent in a temperature range of 70° C. to 250° C., preferably between 100-140° C., with a process stream comprising 0-20 vol. % oxygen, and 0-25 vol. % of water (see FIGS. 4, 5 and Example 3 below). The concentration of Pd (also referred to as the palladium loading of the catalyst) may be in the range of 0.1-2.0 wt. %, or in the range of 0.3-1.1 wt. %, or in the range of 0.5-0.75 wt. %. Hydrogen is mixed with the exhaust gas to achieve a molar ratio for $H_2/NO_x$ in the exhaust gas of 10 to 100, and preferably about 40 to 80. The $H_2$/$NO_x$ ratio will depend on several factors that include, but are not limited to, the concentration of $NO_x$ in the process stream, the operating temperature, the exhaust space velocity and the desired level of $NO_x$ reduction.

A promoter such as tungsten W can substantially improve the catalyst performance. As seen in Example 4 and FIG. 6, the addition of a small amount of W (for example tungsten loading of 0.5 to 5.0 wt. % of the catalyst) allows to achieve a high $NO_x$ removal efficiency within a wider range of concentrations of water and $SO_2$ in the gas turbine exhaust. While not wishing to be bounded by any particular theory, it is believed that addition of promoters such as W helps to reduce the oxidation activity of the catalyst and, consequently, decreases oxidizing of $H_2$ to water. As a result more hydrogen is available in the reaction zone to facilitate the reduction of $NO_x$ in the presence of $H_2$ to produce $N_2$ and water.

Figure 7:
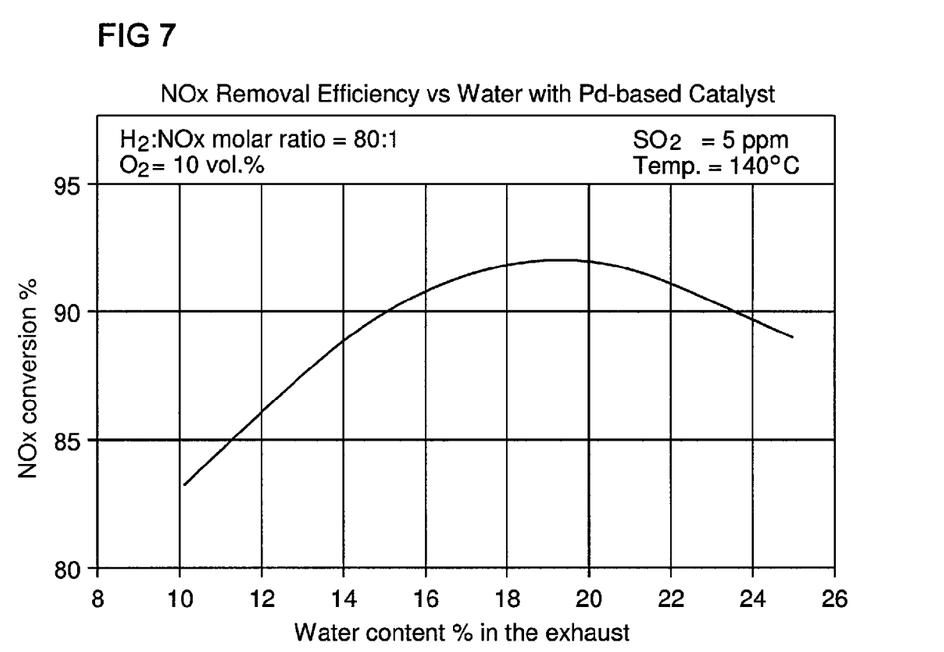
FIG. 7 shows NO$_x$ reduction efficiency over an extended range of water content in the exhaust gas.

Introducing water into the exhaust downstream of the gas turbine can improve the $NO_x$ reduction efficiency of the present catalyst, should insufficient water be present in the exhaust and can be used as an active parameter to increase $NO_x$ removal. For example, steam can be mixed with the $H_2$ stream and injected through an $H_2$ distribution grid upstream of the $H_2$-SCR. This setup also allows for additional water to be added to the process stream when additional water is needed to achieve the target $NO_x$ reduction efficiency. However, as seen in FIG. 7 of Example 5, there comes a point, above about 20% $H_2O$ vol. % for the illustrated embodiment when additional water causes a decrease in the $NO_x$ removal efficiency. As shown in FIG. 7, a preferred range of $H_2O$ is about 15-23 vol. %, and more preferably about 17-21 vol. %. It is believed that the addition of water into the process stream up to a certain level allows for reducing the $H_2$ oxidation rate according to the LeChatelier's principle. The further increase of water concentration in the exhaust is believed to reduce $NO_x$ removal efficiency due to blockage of some of the active sites.

Figure 8:
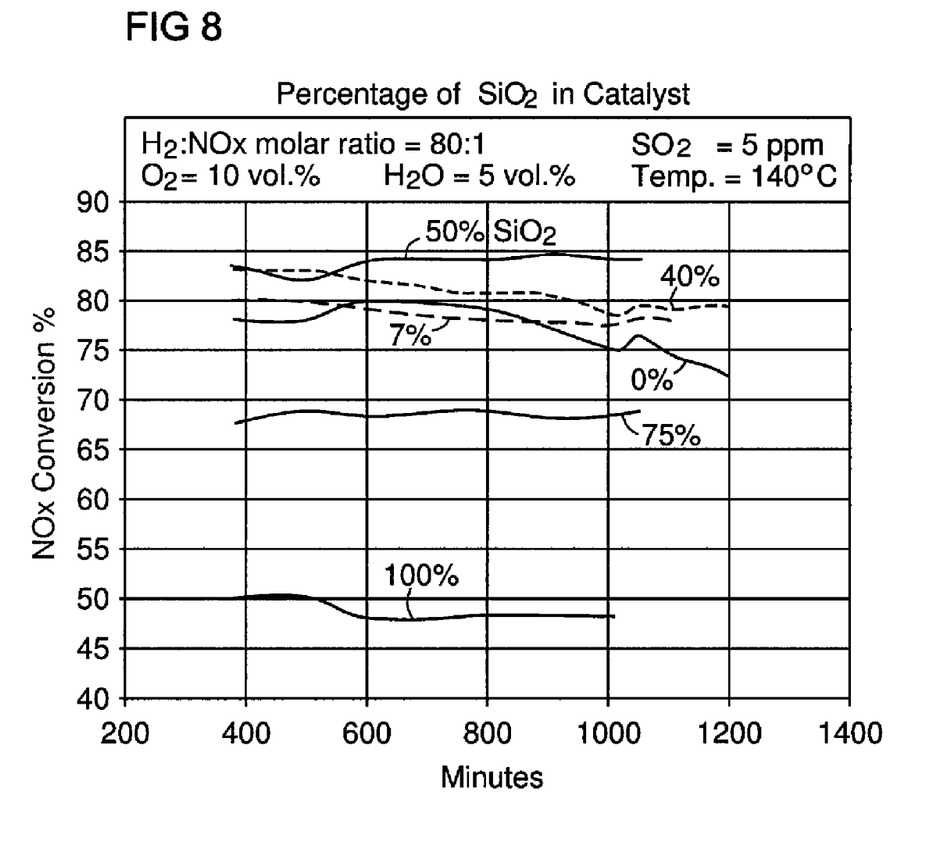
FIG. 8 shows NO$_x$ reduction efficiency for various percentages of SiO$_2$ in the catalyst.

The ratio between zirconia and silica in $(ZrO_2-SiO_2)SO_4$ is a factor that affects the behavior of this Pd-based catalyst. It has been found that the addition of silica to the composition of the catalyst improves the catalyst porosity and, as a result, the efficiency of the developed catalytic process is increased (FIG. 8, Example 6). This improvement in the catalyst performance may be observed when the mass of $SiO_2$ compared to the mass of $SiO_2$ plus $ZrO_2$ is in the range of 0.05-0.90 or between 0.25-0.50.

The temperature of the SCR bed can be maintained in the desirable range by choosing the appropriate location for SCR in the HRSG and by controlling of the amount of heat removed by heat exchanged surfaces within the HRSG 31 as known in the art. The exhaust temperature may be further adjusted to the optimum by temperatures and amounts of injected $H_2O$ and diverted hydrogen fuel. A lower bound of an operational temperature range may be established above a dew point temperature in the exhaust stream. The dewpoint depends upon the concentration of $H_2O$ and other constituents (e.g. $SO_3$) of the exhaust stream and its pressure. Operation above the dew point will avoid water condensation in the SCR bed and in post SCR areas. This restricts an operation of the $H_2$-SCR at the temperatures below 110-120° C. in some exhaust conditions.

EXAMPLE 1

This example illustrates a method of synthesis of a pre-sulfated Pd-based catalyst supported on $ZrO_2-SiO_2$ to form Pd/W($ZrO_2-SiO_2$)$SO_4$ with approximately 0.9-1.1 wt % Pd.

4.5 Kg of zirconium hydroxide was added to a 5 gallon pail with 4.5 L of distilled water and 750 g of colloidal silica (Ludox® AS40, which is a 40 wt % suspension of colloidal $SiO_2$ in water). The pH of the resulting zirconium silica solution was adjusted to 3.0 with sulfuric acid, and mixed overnight, producing a zirconium silica sulfate (($ZrO_2-SiO_2$)$SO_4$) material precursor in water. The following morning, the solution was emptied into a pan and placed in an oven to dry at 110° C. Once dried, the zirconium silica sulfate precursor was crushed below 40-mesh and calcined at 650° C. for 2 hrs, producing a ($ZrO_2-SiO_2$)$SO_4$ material. The atomic S/Zr ratio is 0.025, as determined by X-ray photoelectron spectroscopy (XPS) analysis of the calcined powder.

A washcoat was prepared by adding 20 g of the zirconium silica sulfate material, 10 g of colloidal silica, 0.6658 g of ammonium metatungstate (75% W) providing about 0.5 g of W, and 50 mL of DI water to a beaker. The colloidal silica is added to the washcoat as a binder, which causes the zirconium silica sulfate to adhere to the monolithic substrate. Tungsten is added to promote the performance of the catalyst. Catalyst substrates in the form of monolith cores (230 cpsi) were dipped in the slurry to achieve a loading of 110 grams of washcoat per liter of monolith substrate. Excess slurry was removed from the channels of the monolith using an air knife. Following washcoating, the resulting washcoated monolith was calcined at 450° C. for 1 hour.

A palladium metal solution was made by adding to a beaker, 9.955 g palladium chloride solution (8.94% Pt) providing about 0.9 g of Pd, 2.7 g TEA (triethanolamine, http://en.wikipedia.org/wiki/Chemical_formulaC$_6$H$_{15}$NO$_3$), and the solution was diluted to 100 g with DI water. The monolith cores were dipped in this solution, with excess solution blown from the channels using an air knife, yielding a 1.04% Pd loading by washcoat weight. The cores were dried and then calcined at 450° C. for 1 hour.

EXAMPLE 2

This example illustrates the effects of sulfate.

A washcoat was prepared by adding 25 g of zirconium dioxide ($ZrO_2$) and 12.5 g of colloidal silica solution (40% $SiO_2$) to 50 ml of DI water. Two monolith cores (230 cpsi) with a volume of 48 cm³ were dipped into the resulting slurry. The excess slurry was blown from the channels using an air knife. The resulting cores were dried at 110° C., then calcined at 450° C. for 1 hour. The washcoat loading was 105 g washcoat per liter of catalyst volume (g/l).

Each core was impregnated to 1% Pd loading using an impregnation solution prepared by combining 9.1 g of palladium tetraammine chloride solution (8.94 wt % Pd) with 2.44 g of triethanolamine and 100 ml DI water. Each core was dipped into the solution, with the excess solution blown from the channels using an air knife. The cores were then dried in a microwave oven, then calcined at 450° C. for 1 hour. The resulting catalyst is referred to as a 1% Pd/$ZrO_2$ monolith.

Zirconium sulfate, ($ZrO_2$)$SO_4$, was prepared by adding 1 kg zirconium hydroxide to a 4 liter pail. To the pail was added 1 liter DI water. The slurry was mixed using a high shear mixer. The pH of the slurry was adjusted to 3.0 using sulfuric acid, with the pH adjusted periodically. The slurry was blended overnight, with a final pH adjustment being made in the morning. The resulting slurry was removed form the mixer and placed in a glass pan. The slurry was dried at 110° C. The dried slurry was calcined at 650° C. for 2 hours in order to from the ($ZrO_2$)$SO_4$.

A washcoat was prepared by adding 20 g of the above prepared ($ZrO_2$)$SO_4$ and 10 g of colloidal silica solution (40% $SiO_2$) to 50 ml of DI water. Two monolith cores (230 cpsi) with a volume of 48 cm³ were dipped into the resulting slurry. The excess slurry was blown from the channels using an air knife. The resulting cores were dried at 110° C., then calcined at 450° C. for 1 hour. The washcoat loading was 115 g washcoat per liter of catalyst volume (g/l).

Each core was impregnated to 1% Pd loading using an impregnation solution prepared as described above. The cores were then dried in a microwave oven, then calcined at 450° C. for 1 hour. The resulting catalyst is referred to as a 1% Pd/($ZrO_2$)$SO_4$ monolith.

The Table below compares the performance of the two catalysts and serves to illustrate the effects of sulfate on catalyst performance. Both catalysts were evaluated for their ability to reduce $NO_x$ using H2 in a process stream comprising 10% $O_2$, 5% $H_2O$, 10 ppm NO and 800 ppm $H_2$ ($H_2$/NO=80), balance $N_2$. The Gas Hourly Space Velocity (GHSV) employed in both cases was 10,000. The maximum conversion of 60.4% was achieved at 188° C. for the 1% Pd/ZrO$_2$ monolith. The maximum conversion of 80.4% was achieved at 123° C. for the 1% Pd/(ZrO$_2$)SO$_4$ monolith. Note that the addition of sulfate enhances the maximum NO$_x$ reduction efficiency and reduces the operating temperature of the catalyst.

| Catalyst | Temperature | NO$_x$ Reduction Efficiency |
|---|---|---|
| 1% Pd/ZrO$_2$ Monolith | 188° C. | 60.4% |
| 1% Pd/(ZrO$_2$)SO$_4$ Monolith | 123° C. | 80.4% |

EXAMPLE 3

A catalyst was prepared according to the procedure described in Example 1, with the concentration of Pd being varied between 0.3 and 1% (by weight, g Pd/g washcoat). No tungsten was added to the catalyst. the testing conditions were as follows:

Two monolithic catalyst blocks were placed in a glass reactor. The distance between the blocks was 10 mm. The simulated gas turbine exhaust was composed of 10 vol. % O$_2$, 800 ppm H$_2$, 10 ppm NO, 5 vol. % H$_2$O, and the balance N$_2$. The Gas Hourly Space Velocity (GHSV) was 10,000 hr$^{-1}$, and the catalyst was heat treated by a programmed temperature controller at an increase of 2° C./min up to 250° C. in order to remove residue from the calcinations operation. Following the programmed temperature ramp, the temperature was dropped to 120-140° C. in order to conduct NO$_x$ reduction tests at power plant operating conditions. These results are shown in FIGS. 4 and 5.

EXAMPLE 4

Figure 6:
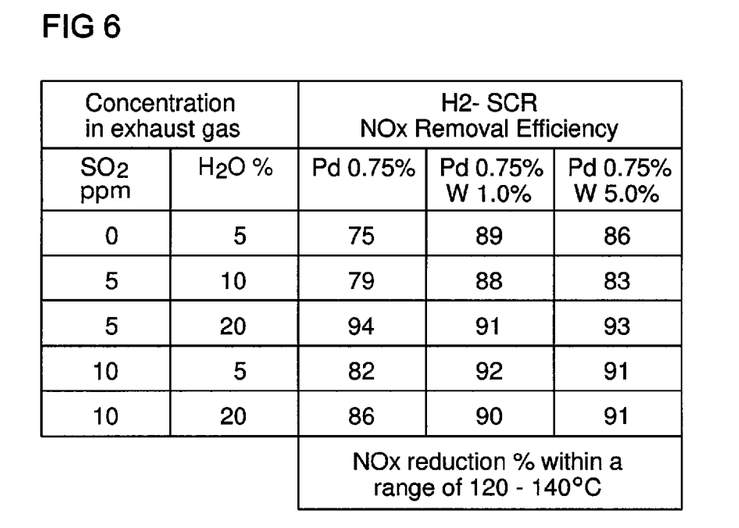
FIG. 6 shows NO$_x$ reduction efficiency using various chemical proportions within a temperature range of 120-140° C.

The Example illustrates the performance of the developed catalyst under different operating conditions. The catalyst was prepared according to the procedure described in Example 1 with the concentration of Pd 0.75% (g Pd/g washcoat). Two blocks of the catalyst were placed in the glass reactor. The distance between the blocks was 10 mm. The catalyst was heat treated at 2° C./min up to 250° C. with a programmed temperature controller, in a composite gas stream of, 5 vol. % H$_2$O and 0 ppm SO$_2$, 10 vol. % O$_2$ and balance N$_2$. Following the temperature ramp, the catalyst was cooled to 120-140° C. in order to conduct NO$_x$ reduction tests under simulated gas turbine exhaust. The simulated gas turbine exhaust was composed of 10 vol. % O$_2$, 800 ppm H$_2$, 10 ppm NO, 0.5-25 vol. % H$_2$O, 0-10 ppm SO$_2$ and the balance N$_2$. GHSV was 10,000 hr$^{-1}$. The results are shown in FIG. 6. This example demonstrates a positive influence of the addition of Tungsten, which increases the acceptable range of water and SO$_2$ conditions that ensure high NO$_x$ reduction efficiency.

EXAMPLE 5

This Example illustrates an influence of H$_2$O in the exhaust on the performance of the developed catalyst. The catalyst was prepared according to the procedure described in Example 1, with the concentration of Pd 0.75% (g Pd/g washcoat). Two blocks of the catalyst were placed in a glass reactor. The distance between the blocks was 10 mm. The simulated gas turbine exhaust had 10 vol. % O$_2$, 800 ppm H$_2$, 10 ppm NO, 5-25 vol. % H$_2$O, 5 ppm SO$_2$, and N$_2$ was the balance. The GHSV was 10,000 hr$^{-1}$. The catalyst was exposed to the flow of the gas with the above mentioned composition by means of a programmed temperature treatment, first at 5 vol. % H$_2$O and 0 ppm SO$_2$, while increasing temperature by 2° C./min up to 250° C. Then the gas temperature was reduced to 120-140° C. to conduct NO$_x$ reduction tests under different gas compositions. The results are illustrated in FIG. 7, and demonstrate that the catalyst of the novel process described herein not only is resistant to water in the process stream, but that water has a positive influence on the catalyst performance in a range of concentrations up to about 25 vol. %, especially between 15-23%, and preferably between 17-21%, with a peak at about 20%. Further increase of water concentrations above about 20% may cause a slight decrease of the catalyst performance with respect to NO$_x$ emissions.

EXAMPLE 6

This Example illustrates an influence of adding SiO$_2$ to the presulfated catalyst on the performance of the developed catalyst. The catalyst was prepared according to the procedure described below with the concentration of Pd 0.75% (g Pd/g washcoat). Zirconium hydroxide was added to a beaker with silicon acetate solution (40% SiO$_2$) in a ratio between 0.5 to 6 g zirconium hydroxide per 1 g silicon acetate solution. DI water was added to the solution in a ratio of 1 g DI water per 1 g zirconium hydroxide. The pH of the zirconium silica solution was adjusted to 3.0 with sulfuric acid (Aldrich) and mixed overnight. The following morning, the solution was emptied into a pan and placed in an oven to dry at 110° C. Once dried, zirconium sulfate was crushed below 40-mesh and calcined at 650° C. for 2 hrs.

Washcoat was prepared by adding 20 g of said zirconium silica sulfate, 10 g of a silicon acetate solution (40% SiO$_2$), and 50 mL of DI water to a beaker. The monolith cores (230 cpsi) were dipped in the slurry to achieve a loading of 108 g/L washcoat. Catalyst cores were calcined at 450° C. for 1 hour.

A palladium metal solution was made by adding to a beaker, 7.6 g palladium chloride solution (8.94% Pt), 2.04 g TEA (Triethanolamine, Ashland), and solution were diluted to 100 g with DI water. Monolith blocks were dipped in said solution yielding a 0.79% Pd loading by washcoat weight. Blocks were microwave dry and then calcined at 450° C. for 1 hour. Two blocks of the catalyst were placed in the glass reactor, The distance between the blocks was 10 mm. The simulated gas turbine exhaust had 10 vol. % O$_2$, 800 ppm H$_2$, 10 ppm NO, 5 vol. % H$_2$O, 5 ppm SO$_2$, and N$_2$ is the balance. The GHSV was 10,000 hr$^{-1}$. The catalyst was exposed to the flow of the gas with the above composition except without SO$_2$ during a programmed temperature treatment that increased the temperature 2° C./min up to 250° C. Then the catalyst was cooled to 120-140° C. in order to conduct NO$_x$ reduction tests under different gas compositions. FIG. 8 shows that optimum results are achieved when the ratio of SiO$_2$ to ZrO$_2$ in the (ZrO$_2$—SiO$_2$)SO$_4$ support material is approximately 50 wt %.

Herein the term "coating" is used to describe either a surface layer or a surface portion of an SCR bed containing a catalytic material. Catalytic materials may diffuse partly into or throughout the substrate, thus blurring the interface between the coating and the substrate. However, "coating" is nevertheless a useful term because it indicates a region of catalytic material at the surface of a catalyst bed in which certain percentages by weight apply.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for selective catalytic reduction of nitrogen oxides (NOx) in a gas stream using H2, comprising contacting the gas stream with a catalyst comprising (ZrO2)SO4 and palladium,
wherein the catalyst further comprises tungsten.

2. A process according to claim 1, wherein a tungsten loading of the catalyst is between 0.5 and 5 wt. %.

3. A process according to claim 1 wherein the catalyst further comprises SiO2.

4. A process according to claim 3 wherein a mass ratio of SiO2 to (ZrO2+SiO2) in the catalyst is between 0.05 and 0.90.

5. A process according to claim 3 wherein a mass ratio of SiO2 to (ZrO2+SiO2) in the catalyst is between 0.25 and 0.50.

6. A process according to claim 1 wherein the palladium loading of the catalyst is between 0.01 and 2.0 wt %.

7. A process according to claim 1 wherein the atomic S/Zr ratio of the catalyst is between 0.01 and 0.15.

8. A process according to claim 1, wherein a catalyst bed comprising the catalyst is installed in a flow path of an exhaust gas stream of a gas turbine, wherein the exhaust gas stream comprises NOx, H2O, O2, and SO2.

9. A process according to claim 8 wherein H2O and hydrogen are injected into the exhaust gas between the gas turbine and the catalytic bed, to a concentration of about 5-25 vol. % H2O and a molar ratio for H2/NOx in the range of 10 to 100 in the exhaust gas.

10. A process of claim 8 wherein the process comprises passing the exhaust gas over the catalytic bed at a temperature between 70-250° C.

11. A process according to claim 8, wherein the exhaust gas is passed over the catalytic bed at a temperature maintained in a range of 110-140° C.

12. A process according to claim 8, wherein the catalyst bed is installed in the flow path of exhaust gas of the gas turbine in an integrated gasification combined cycle (IGCC) power generation plant that synthesizes a hydrogen-containing fuel for the gas turbine, and further comprising:
diverting a portion of the hydrogen-containing fuel to supply the H2 as a NOx reducing agent;
injecting water and the diverted portion of the hydrogen-containing fuel into the exhaust gas between the gas turbine and the catalytic bed to a concentration of about 15-25 vol. % H2O and a molar ratio for H2/NOx in the range of 10-100 in the exhaust gas; and
passing the exhaust gas over the catalytic bed at a temperature between 70-250° C.

13. A process according to claim 12, wherein the H2O is injected to a concentration of about 17-21 vol. %.

14. A system for implementing a process for selective catalytic reduction of nitrogen oxides (NOx) in an exhaust gas from a gas turbine in an integrated gasification combined cycle power plant, comprising:
a fuel gas synthesizer that produces a fuel gas containing at least 10 vol. % H2 and at least 10 vol. % nitrogen;
a gas turbine that burns a portion of the fuel gas, producing the exhaust gas;
a catalytic bed installed in a flow path of the exhaust gas, the catalytic bed comprising a catalyst comprising (ZrO2)SO4 and palladium;
a hydrogen injector that mixes a diverted portion of the fuel gas into the exhaust gas between the gas turbine and the catalytic bed;
an H2O injector that mixes H2O into the exhaust gas between the gas turbine and the catalytic bed; and
sensors and valves at control points in the system connected to a controller that maintains operational conditions in the exhaust gas at the catalytic bed, wherein the operational conditions comprise a temperature between 70-250° C., a molar ratio for H2/NOx in the range of 10-100, and H2O at a concentration of about 15-23 vol. %.

15. A system for implementing a process according to claim 14, wherein the catalyst further comprises SiO2, and a mass ratio of SiO2 to (ZrO2+SiO2) in the catalyst is between 0.25 and 0.50.

16. A system for implementing a process according to claim 15, wherein the catalyst further comprises a tungsten loading of between 0.5 and 5 wt. %.

17. A system for implementing a process according to claim 16, wherein a palladium loading of the catalyst is between 0.01 and 2.0 wt. %.

18. A process for selective catalytic reduction of nitrogen oxides (NOx) in a gas stream using a hydrogen reducing agent, comprising:
preparing a catalyst on a catalyst bed, wherein the catalyst comprises Pd/W(ZrO2-SiO2)SO4, wherein a ratio of SiO2 to (ZrO2+SiO2) in the catalyst is 25 to 50 wt %, a proportion of Pd in the catalyst is 0.3 to 1.1 wt %, an atomic S/Zr ratio of the catalyst is 0.01 to 0.15, and a tungsten loading of the catalyst is 0.5 to 5 wt %;
positioning the catalyst bed in an exhaust stream of a gas turbine;
injecting the hydrogen reducing agent into the exhaust stream upstream of the catalyst bed to a molar ratio for H2/NOx in the exhaust stream in the range of 20-100;
injecting H2O into the exhaust stream upstream of the catalyst bed to maintain an H2O concentration in the exhaust stream of about 15-23 vol. %; and
passing the exhaust stream over the catalyst bed at an operating temperature range of 70-250° C.

19. The process of claim 18, wherein the gas turbine is installed in an integrated gasification combined cycle plant (IGCC), and further comprising:
producing a hydrogen-containing fuel in a gasifier of the IGCC for the gas turbine;
diverting a portion of the hydrogen-containing fuel as the hydrogen reducing agent; and
cooling the exhaust stream to the operating temperature range of the catalyst bed by means of a heat recovery steam generator in the IGCC, wherein a lower bound of the operating temperature range is established above a dewpoint in the exhaust stream.

* * * * *